May 12, 1959

C. T. DENKER 2,886,125

SUCTION CLEANERS

Filed Aug. 19, 1955

INVENTOR.
CHARLES T. DENKER
BY Wallace & Cannon ATTYS.

United States Patent Office 2,886,125
Patented May 12, 1959

2,886,125
SUCTION CLEANERS

Charles T. Denker, Chicago, Ill.

Application August 19, 1955, Serial No. 529,541

1 Claim. (Cl. 183—22)

This invention relates generally to suction cleaners, and more particularly to improved apparatus for separating dust from the air moved by such cleaner in the cleaning operation.

It is a principal object of the invention to provide a device for separating dust from the dust laden air from a suction type cleaner, such device being mounted for movement with the cleaner, and being effective for separation of dust during all the usual ranges of movement of the operating handle of such cleaner.

Another object of the invention is to provide an improved device for use in connection with apparatus of the general class described, such dust separating device being characterized by a tank having a partition which separates the tank into a lower liquid containing chamber and an upper chamber, the air being separated from its dust content by being bubbled below the level of the liquid contained in the lower chamber and being separated from its entrained water content in the upper chamber, the detrained liquid being capable of being returned to the lower chamber.

Another object of the invention comprehends the provision of a transversely extending partition which performs the function of separating a cleaning tank into upper and lower chambers, said tank being normally held in a position where the partition acts as a baffle during the passage of dust laden air in a lower liquid containing chamber, said partition in a tilted position of the walled tank maintaining the liquid in one of two side by side chambers, so that there is no possibility of the liquid leaking from the other chamber.

Other objects and important features of the invention will be apparent from a study of the specification following taken with the drawing, which together describe and illustrate a preferred embodiment of the invention, and what is now considered to be the best mode of practicing the principles thereof. Other embodiments of the invention may be suggested to those having the benefit of the teachings herein, and it is therefore intended that the scope of the invention not be limited by the precise embodiment herein shown, such other embodiments being intended to be reserved especially as they fall within the scope and purview of the subjoined claims.

Figure 1:
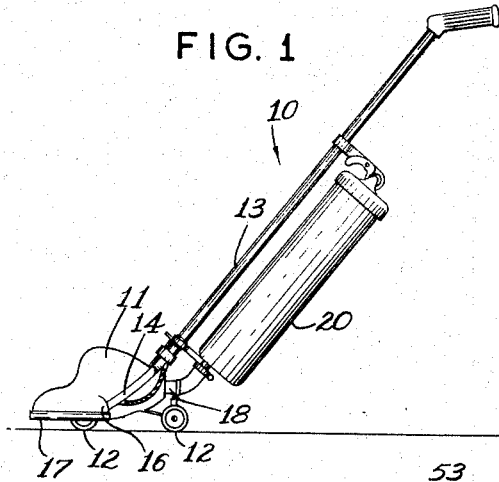
Fig. 1 is a side elevation view of a suction cleaner having the improvements according to the present invention embodied therein.

Referring now to Fig. 1 of the drawings there is shown a suction cleaner indicated generally by the reference numeral 10, and including a housing 11 mounted for movement upon wheels 12. The suction cleaner 10 can be moved to and fro upon the wheels 12 by means of an operating handle 13 which is bifurcated at its lower end as at 14, said bifurcated lower end being pivoted as at 16 to the housing 11, so that if desired the cleaner can be operated beneath tables, chairs or the like.

The housing 11 contains suction means, consisting of a motor and an impeller, not shown, air being drawn through a suction opening 17 at the forward end of the housing 11 and being discharged at a passageway 18.

The dust laden air from the suction cleaner 10 is arranged to be scrubbed or removed of its dust content within a tank 20.

Referring now to Figs. 2 to 5 of the drawing, the tank 20 has a bottom wall 19 with flange-like extension 21 extending downward therefrom and a side wall of cylindrical form extending upwardly therefrom. The tank 20 is arranged to be supported at its lower end by means of a bracket 22 secured at one end to the operating handle 13 and secured at its other end to the flange-like extension 21.

The upper end of the tank 20 is provided with a closure 23 which has an inturned annular flange 24 which supports a gasket 26 which bears against an upper rim 27 of the tank 20. The closure 23 for the upper end of the tank 20 has diametrically opposed bayonet slots 28 which cooperate with bayonet pins 29 extending inwardly from the closure 23 to cause the closure 23 to be firmly engaged with the tank 20.

The upper end of the tank 20 and its closure 23 are secured to the operating handle 13 by means of a handle or bail 31 extending from closure 23, the bail 31 being engaged by a pair of locking arms 32 and 33, locking arm 32 being secured to the handle 13, and locking arm 33 being pivoted with respect to the locking arm 32 at a pivot point 34. The two locking arms 32 and 33 are biased to the locking position shown by means of a spring 36 held in the locking arm 32 and bearing against the locking arm 33.

The flangelike extension 21 from the lower wall 19 of the tank 20 forms a support for an entrant end 37 of a pipe 38 which passes through a body of liquid 39 contained in the lower end of the tank 20. The entrant pipe 38 extends upward through the body of liquid 39 and is reversed upon itself so that its discharge end 41 extends beneath the body of liquid 39. The pipe 38 is supported in part by a partition 42 or baffle, which is inclined in the manner shown with respect to the longitudinal axis of the tank 20. Thus, the partition 42 is in the form of a solid member or water-tight bulkhead engaged at one end within the tank at the side spaced the greater distance from the handle 13 and at a point removed a substantial predetermined distance from the bottom wall of the tank. The partition 42 extends toward the opposite side of the tank which is nearer the handle 13, and complementally engages the inside of the tank for substantially the entire periphery to seal off a lower chamber 50. The partition 42 is progressively inclined from said one end in the direction of the bottom wall of the tank so that the partition 42 is progressively closer to the bottom wall of the tank in the portion outwardly of the said one end thereof. Partition 42 has openings 43 and 44 therein for the bends of the pipe 38 which may be welded to the partition 42 at such openings.

The partition 42 is welded along its periphery to the inside of the cylindrical wall of the tank 20, but has a relieved portion 46 which provides a passageway 47 for air which has been bubbled through the body of liquid 39.

The flange like extension 21 is connected to the passageway 18 for dust laden air from the cleaner 10 by means of a short length of flexible hose 48 which is held by a hose clamp 49 at its upper end to the flange-like extension 21 and at its lower end to the passageway 18 by a similar hose clamp 51.

The dust-laden air resulting from the operation of the suction cleaner 10 is thus arranged to be conducted below the surface of the liquid 39 contained in a lower chamber 50 of the tank 20, and the opening 41 may be provided with a suitable baffle or diffuser 52 to finely divide the air bubbling beneath the liquid 39. During such action the body of liquid is agitated rather violently but it is confined to the lower chamber by the inclined baffle 42.

It will be noted that the opening 41 is in a direction so as to cause currents of dust-laden air and liquid to be directed away from the passageway 47 and underneath the partition 42 at points remote from the passageway 47. The placing of the pipe opening 41 in the manner described tends to prevent liquid from being forced from chamber 50 by way of passageway 47.

The air which has been separated from its dust content thence moves through the passageway 47 into an upper chamber 53. The closure 23 has a plurality of openings 54 therein, through which the cleaned air may escape from the tank 20. However, prior to the escape of the cleaned air through the openings 54, it is detrained of its water content by means of a generally bell shaped baffle 56 which has a diameter somewhat less than the inner diameter of the tank 20 to provide an annular passageway 57 past which the air must move. The baffle 56 is supported by the closure 23 by means of a central post 58 threaded into a boss 59 on the underside of the closure 23.

Figure 2:
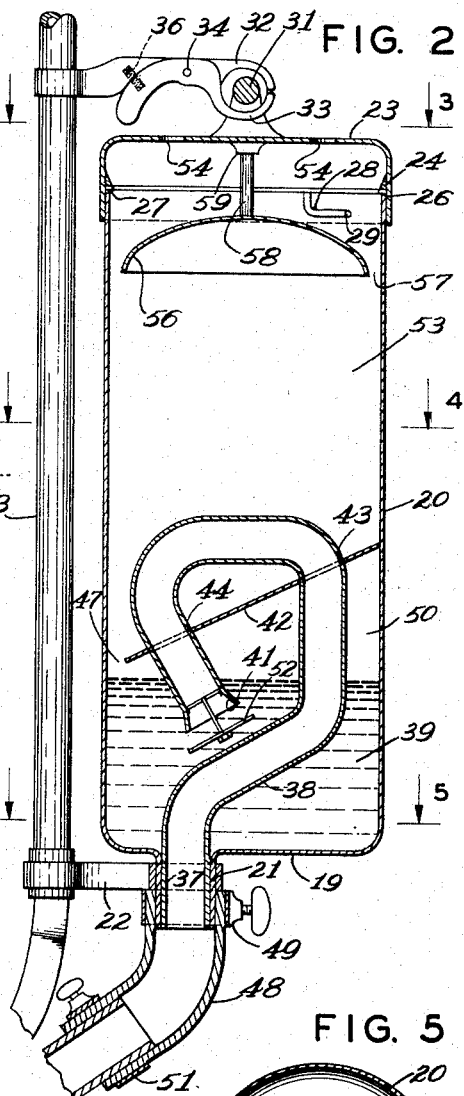
Fig. 2 is a vertical sectional view through a dust separating tank supported on the structure seen in Fig. 1.
Figure 2A:
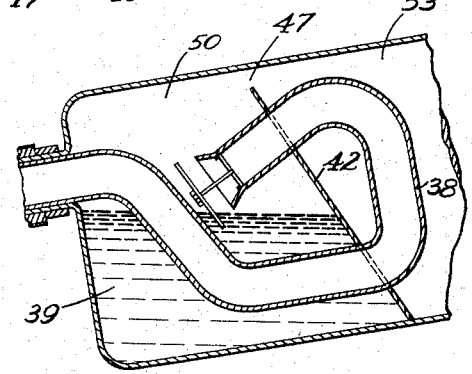
Fig. 2A is a partial vertical sectional view similar to Fig. 2 showing the tank tilted to a position wherein the liquid contained in the tank is maintained confined to the liquid chamber thereof.
Figure 3:
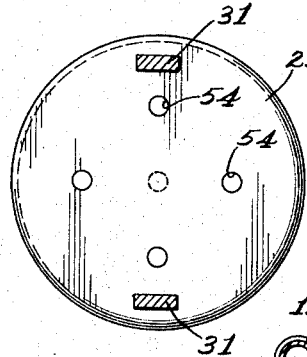
Fig. 3 is a top plan view of the tank seen in Fig. 2, said view being taken along the line 3—3 of Fig. 2 looking in the direction of the arrows.
Figure 4:
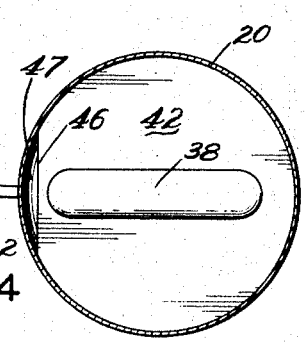
Fig. 4 is a transverse sectional view taken along the line 4—4 of Fig. 2, looking in the direction of the arrows.
Figure 5:
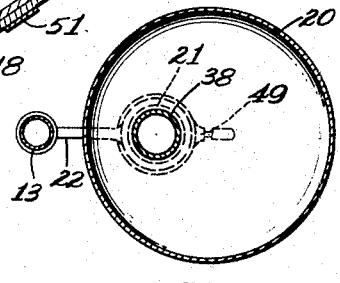
Fig. 5 is a transverse sectional view taken along the line 5—5 of Fig. 2 and looking in the direction of the arrows.

Under certain conditions of operation it is necessary to move the operating handle 13 downward as may be necessary to clean beneath tables, chairs or the like. Under such condition of operation the tank 20 may take the position as seen in Fig. 2A, at which time the partition 42 or baffle operates to maintain the body of liquid 39 within the chamber 50, the baffle or the partition 42 at such time dividing the tank into two side by side chambers as shown. Under such condition of operation the body of liquid 39 is still effective to separate the dust from the air, the force of the stream of air from the pipe 38 rather violently agitating the body of liquid 39. However, the baffle or partition 42 is still effective to keep substantially all of the liquid within the chamber 50, any liquid entrained in the air as before being removed by the baffle 56.

Upon return of the cleaner 10 to the position seen in Fig. 1, any liquid entrapped in the chamber 53 will flow over the top of the baffle 42 back into the lower chamber 50.

The tank 20 may be readily removed from the operating handle 13, its closure 23 opened, and the hose clamp 49 released so that the tank may be discharged of its contaminated liquid in a manner readily understood. The tank may be readily refilled once more through its top opening, and can be readily filled to a desired level as ascertained by inspection. Preferably, the level of the liquid within chamber 50 is maintained just below the level of the passageway 47.

From the foregoing description it will be evident that there has been provided a novel and useful apparatus for separating the dust from the dust laden air resulting from operation of a portable suction cleaner. While the invention has been described in terms of a preferred embodiment thereof its scope is intended to be limited only by the claim here appended.

I claim as my invention:

A device of the class described for removing dust from dust laden gases comprising a walled tank having sides and a bottom, a solid partition within said tank and engaged at one end with one side of the tank and extending toward the other side of the tank at an angle to divide said tank into an upper chamber and a lower chamber for containing liquid, means for conducting dust laden gases beneath the surface of a quantity of liquid contained in said lower chamber for scrubbing of said dust laden gases by bubbling thereof through said liquid, an opening in said partition through which the scrubbed gases must move in passing to said upper chamber, said partition opening being disposed closely to a wall of said tank at the other side thereof, said means including a tube extending from the bottom of the tank through said lower chamber and through said partition near the engaged end thereof and into said upper chamber, said tube being reversely bent and extended back through said partition near said partition opening and terminating in a discharge end which is disposed in said lower chamber and which is directed away from said partition opening and toward the engaged end of said partition, and said partition being inclined with respect to the walls of said tank so that the engaged end thereof is spaced a predetermined distance from the bottom of the tank with the opposite end thereof spaced closer to the bottom of the tank.

References Cited in the file of this patent

UNITED STATES PATENTS

| | | |
|---|---|---|
| 1,226,589 | Pollock | May 15, 1917 |
| 1,839,582 | Nordhem | Jan. 5, 1932 |
| 2,062,728 | Roberts | Dec. 1, 1936 |
| 2,693,000 | Minerley | Nov. 2, 1954 |